(12) United States Patent
Trescott

(10) Patent No.: US 6,910,844 B2
(45) Date of Patent: Jun. 28, 2005

(54) SELF-LOADING VEHICLE FOR SHIPPING CONTAINERS

(76) Inventor: William B. Trescott, 8028 Highway 457, Bay City, TX (US) 77414

( * ) Notice: Subject to any disclaimer, the term of this patent is extended or adjusted under 35 U.S.C. 154(b) by 187 days.

(21) Appl. No.: 10/065,841

(22) Filed: Nov. 25, 2002

(65) Prior Publication Data

US 2003/0057663 A1 Mar. 27, 2003

Related U.S. Application Data

(63) Continuation-in-part of application No. 09/901,300, filed on Jul. 10, 2001, now abandoned.

(51) Int. Cl.[7] .................................................. B60P 3/00
(52) U.S. Cl. ........................ 414/458; 414/495; 180/209
(58) Field of Search ................................ 414/456, 426, 414/459, 911, 471, 495, 498; 180/209

(56) References Cited

U.S. PATENT DOCUMENTS

| | | | | |
|---|---|---|---|---|
| 2,218,881 A | * | 10/1940 | Herlach | 89/40.13 |
| 3,356,239 A | * | 12/1967 | Klein | 414/458 |
| 3,792,789 A | * | 2/1974 | Oehler | 414/458 |
| 4,556,356 A | | 12/1985 | Niva | 414/458 |
| 4,655,670 A | * | 4/1987 | Hogberg et al. | 414/458 |
| 5,678,977 A | * | 10/1997 | Nordlund | 414/458 |
| 5,857,823 A | * | 1/1999 | MacEachern | 414/458 |
| 5,879,122 A | | 3/1999 | Voelzke | 414/458 |

* cited by examiner

Primary Examiner—Eileen D. Lillis
Assistant Examiner—Charles A. Fox
(74) Attorney, Agent, or Firm—John R. Merkling

(57) ABSTRACT

A U-shaped vehicle with flexible beams equipped with an adjustable toe-angle, variable height suspension. Containers are attached between the beams of the vehicle. The rear suspension has a variable toe angle to control the spread of the beams so the vehicle can back around a container. Rear wheel axles are mounted on arms connected to pivot joints. An axle and its pivot points are non-co-planer. The pivot points are angled so that an outer pivot point is higher than an inner pivot point. When the vehicle is lowered close to the ground, the rear wheels develop slight toe out. When the vehicle is raised above Its normal ride height, the rear wheels develop slight toe in, and the beams of the vehicle spread apart when the vehicle is driven in reverse.

24 Claims, 7 Drawing Sheets

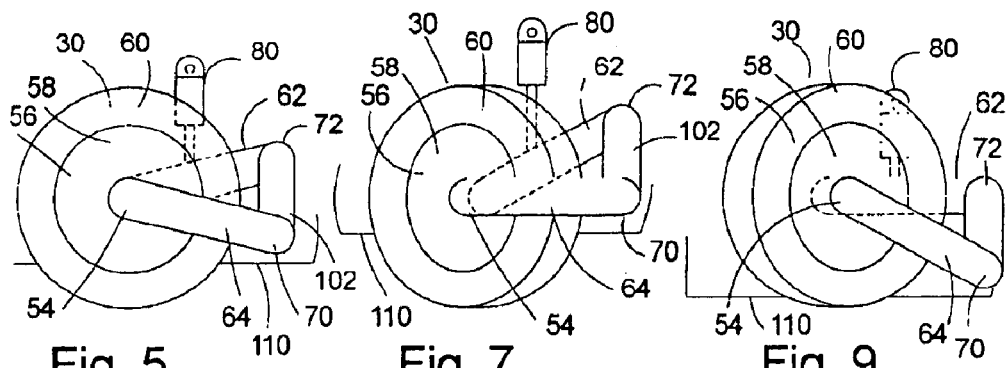
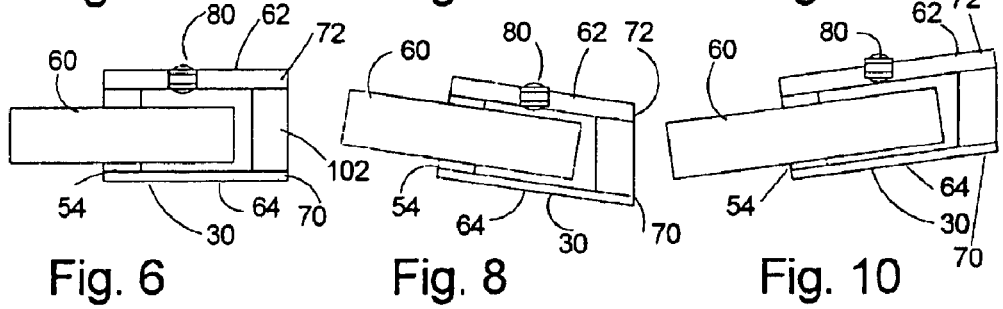
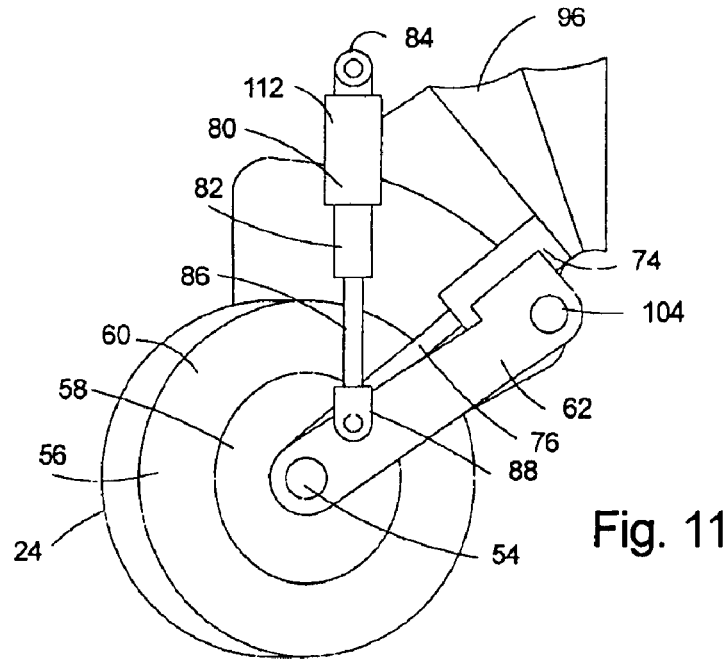

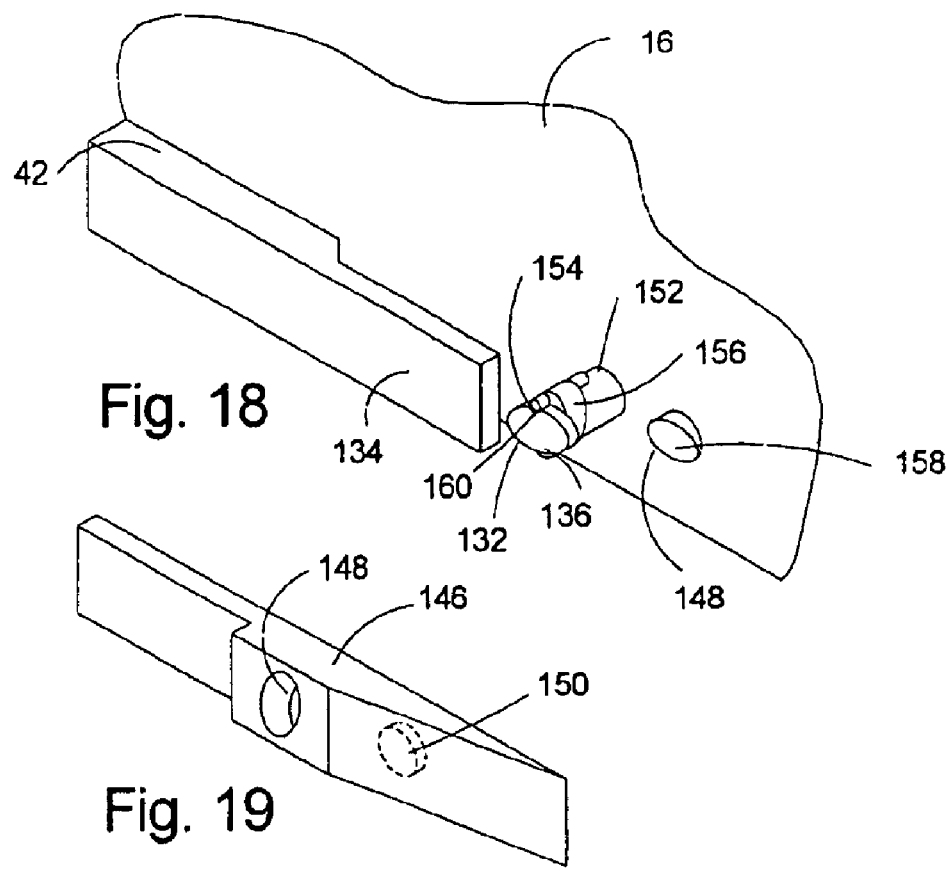
Fig. 18
Fig. 19
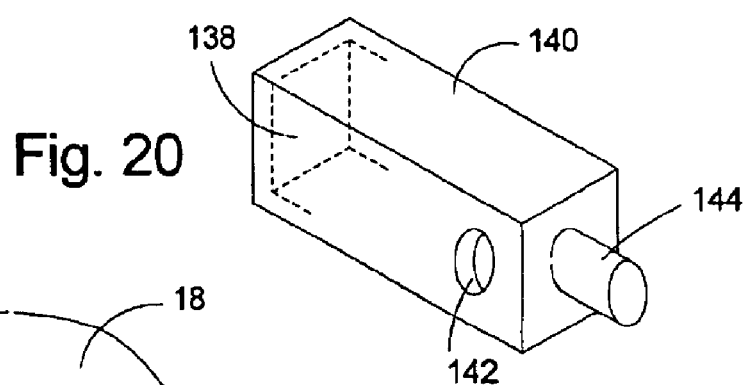
Fig. 20
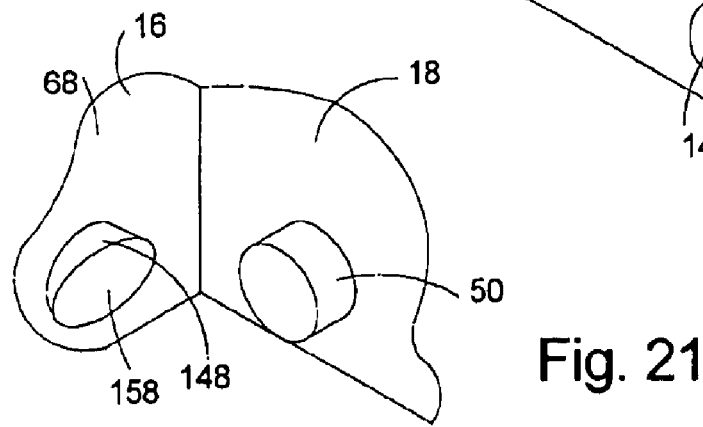
Fig. 21

SELF-LOADING VEHICLE FOR SHIPPING CONTAINERS

CROSS REFERENCE TO RELATED APPLICATIONS

This application is a continuation in part of U.S. patent application Ser. No. 09/901,300, filed Jul. 10, 2001 now abandoned, the disclosure of which is incorporated herein by reference.

BACKGROUND OF INVENTION

The present invention relates to vehicles for transporting goods, and in particular to vehicles for transporting shipping containers.

Vehicles and trucks of various kinds are widely available for transporting goods. Trucks for carrying large loads in enclosed containers are generally quite tall and, consequently, unstable. It is an object of the present invention, therefore, to provide a vehicle for transporting goods presenting a relatively low, wide and stable configuration.

Further, it is known to load trucks by mounting a large shipping container on the truck. Shipping containers of this type can be transferred from one form of transportation to another without unloading or handling the goods contained therein. Thus a shipping container may be initially loaded, then placed on a truck, transferred to a railroad car, set on a ship, removed to another railroad car, and finally carried by another truck to a final destination, all without handling the goods loaded in the shipping container. Cranes or other apparatus have usually been necessary for transferring the containers from one transport to another. Such a container could not be easily unloaded from a truck, stored, and reloaded on the truck without additional lifting apparatus. It is a further object of the present invention to provide a vehicle that can pick up and set down a large shipping container without auxiliary mechanisms.

One form of vehicle for moving containers has a U-frame with rearwardly extending side frames or beams. Such vehicles are shown, for example, in U.S. Pat. No. 4,556,365 to Niva and U.S. Pat. No. 5,879,122 to Voetzke. As explained by Niva, such trucks are driven backward to a container standing on the ground. The open end of the U-frame is moved backwards such that the U-frame will enclose the container on three sides. As mentioned in Niva and as described in Voetzke, a second inner U-frame is then lifted hydraulically to contact the container and lift it into a transport position. Niva seeks to eliminate the second inner lifting frame by providing specialized coupling for connecting hydraulic cylinders on the vehicle directly to specialized brackets on the container. Nevertheless, it is still difficult to provide a vehicle that can be easily driven around a relatively long container. In both Niva and Voetzke, for example, the containers shown are relatively more narrow near the ground and have a widened top to engage an inner U-frame or special hydraulic lifts while providing clearance near the ground for the first U-frame of the vehicles. Such a shape for the container is suitable for the refuse containers described in Voetzke or the mining containers described by Niva. Standardized shipping containers, by contrast, need a rectangular shape so that they can be stacked in ships, for example. It is an object of the present invention, therefore, to provide a U-frame vehicle for moving containers with improved facility for placing the vehicle around a substantially rectangular shipping container.

SUMMARY OF INVENTION

The self-loading container vehicle of my invention comprises a non-articulated U-shaped vehicle with flexible side structures or beams made of crash absorbent material and equipped with an adjustable toe-angle, variable height suspension. Containers are attached between the side structures or beams of the vehicle. The variable height front and rear suspension allows the container to be lifted off the ground. The rear suspension also has a variable toe angle to control the spread of the flexible beams so it can back around a container and then squeeze or grasp the container so that the container can be tightly secured while being lifted.

The self-loading container vehicle has a wider than normal wheel base, low center of gravity, and crash absorbent side structures which will significantly improve highway safety. Heavy batteries for regenerative braking are also installed in the side structures to enhance crash absorbency. The variable height rear suspension of the vehicle may have a trailing beam design. Rear wheel axles can be mounted on one trailing beam or arm (like an aircraft landing gear), or two beams or arms (like the rear wheel of a mountain bicycle or motorcycle). Regardless of the number of arms, the angle of the pivot where the trailing arms are attached to the side structures of the vehicle is not level with the ground. The pivot bearing is angled so that the outer end is higher than the inner end so that when the vehicle is lowered close to the ground, the rear wheels develop slight toe out and when the vehicle is raised above its normal ride height, the rear wheels develop slight toe in. Thus, when the vehicle is lowered close to the ground, the side structures or beams spread apart when driven forward and toward each other when driven in reverse to allow the grasping and releasing of containers carried between the beams. When the vehicle is raised to a higher than normal ride height, the rear wheels develop toe in and the side structures or beams of the vehicle spread apart when driven in reverse to steer around the front of a container prior to lowering the vehicle to grasp it. They can also squeeze the container when driven forward to help secure the container during an off road collision avoidance maneuver. Control buttons control the height of the vehicle through a computer. By controlling ride height and direction, the driver can spread the side structures apart or pinch them together at will to grasp and release containers.

BRIEF DESCRIPTION OF DRAWINGS

FIG. 5 is a side plan view of a simplified left rear wheel assembly supporting a vehicle at a medium height above the ground.

FIG. 6 is a top plan view of the wheel assembly of FIG. 5.

FIG. 7 is a side plan view of the simplified left rear wheel assembly supporting a vehicle at an elevated height above the ground.

FIG. 8 is a top plan view of the wheel assembly of FIG. 7.

FIG. 9 is a side plan view of the simplified left rear wheel assembly supporting a vehicle at a reduced height above the ground.

FIG. 10 is a top plan view of the wheel assembly of FIG. 9.

FIG. 11 is a plan view of a wheel assembly in extended position.

FIG. 18 is a perspective view of a spade, rail and latch for use along an arm of said vehicle.

FIG. 19 is a perspective view of a wedge for use with the spade, rail and latch of FIG. 18.

FIG. 20 is a perspective view of a support structure for small cargo containers and for connections in the central region of an arm.

FIG. 21 is a perspective view of a support structure near a cab of the vehicle.

DETAILED DESCRIPTION

Figure 1:
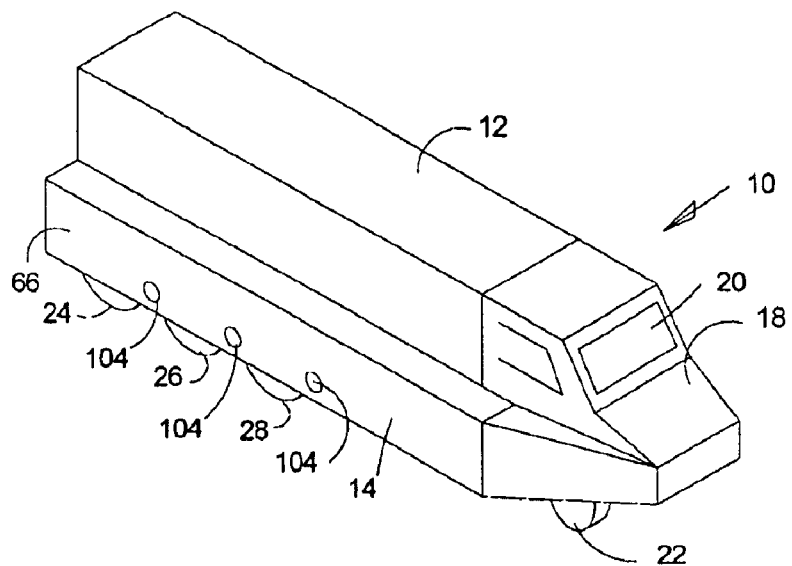
FIG. 1 is a perspective view of a vehicle having two opposed beams according to the present invention with a cargo container.

I will now describe my preferred embodiment of my invention with reference to the accompanying drawings, wherein like numerals are used to refer to like parts. FIG. 1 shows a perspective view of a vehicle 10 according to my invention. The vehicle 10 supports a container 12, such as a standard modular shipping container. The vehicle 10 supports the container 12 on two parallel bendable beams 14, 16. The beams extend rearwardly from a cab 18. The cab 18 comprises an operator's compartment where control apparatus (not shown) for an operator are located. The cab 18 has steerable wheels 22, controlled by the operator, and other standard features well known in the art. The vehicle may be powered by various means, such as by diesel or gasoline engines, by front or rear wheel drives, or by other well known means. In my preferred embodiment, a Diesel-electric or turbo-electric may be used. preferred. Rear wheel assemblies 24, 26, 28, 30, 32, 34 may be equipped with either direct electric drive, electric drive with planetary reduction, worm drive or ring and pinion gear drive (see FIG. 3). Batteries 36 for regenerative braking may be installed, and the rear wheels may be equipped with emergency spring activated brakes (not shown) which will be applied automatically in the event of a computer failure and will only be released when the driver's foot is on an accelerator pedal. The vehicle 10 may be powered by a turbine generator (not shown) with compressed gas as fuel. Compressed gas tanks (not shown) should be located near the turbines so that any gas leaking out can be immediately burned in the turbine exhaust in a large chimney installed In the roof of the cab 18. The compressed gas tanks may be housed inside a non-pressurized outer tank made of crash absorbent material equipped with a diaphragm separating the outer tank from the exhaust system so that leaking compressed fuel will burst the diaphragm and enter the exhaust chimney before the pressure capacity of the outer tank is exceeded.

Figure 2:
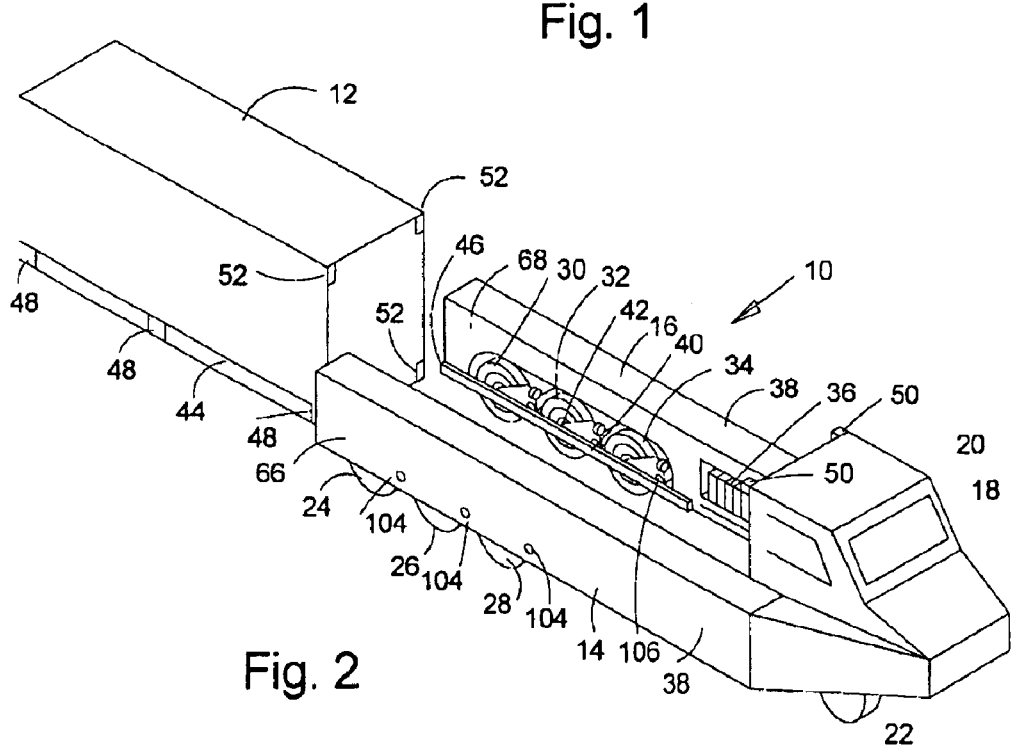
FIG. 2 is a perspective view of the vehicle of FIG. 1 loading a cargo container.

The beams 14, 16 are bendable so that they can flex outwardly (away from each other) or inwardly (towards each other) in response to changing orientation of the rear wheels, as will be explained more fully below. Preferably, the beams 14, 16 comprise generally rectangular fiber glass conduits 38 with steel framing 40 supporting the rear wheels. In FIG. 2, the rear wheels 30, 32, 34 are shown through the conduit 38 for viewing. Preferably, however, the conduit would cover the wheels for strength.

The wheel systems of vehicle 10 raise and lower the vehicle, as will be explained more fully below. As the vehicle is raised, at least some of the rear wheels change their orientation, such that as the vehicle moves backwards to engage a container 12, the beams 14, 16 are forced outwardly away from each other. Bending of the flexible beams provides sufficient clearance for a skilled operator to position the vehicle 10 around the container 12. Although it is preferred to provide bending by the characteristics of the beam, the beams might also be hinged, for example, at their connection to the cab 18. Before the vehicle completely engages the container, the vehicle lowers itself from above a normal drive height to a height near the road surface. As the vehicle changes height, the rear wheels change their orientation such that the beams are driven towards each other, allowing a lift ledge 42 on the beam to engage a lip 44 on the container 12. The container can then be secured in the vehicle by shackles 46 that couple with attachment sites 48 on the container. Lifting pins 50 on the cab 18 may be provided to engage lift sites 52 on the container 12. It is known to provide such lift sites 52 on containers for attachment by a crane or similar apparatus.

Figure 3:
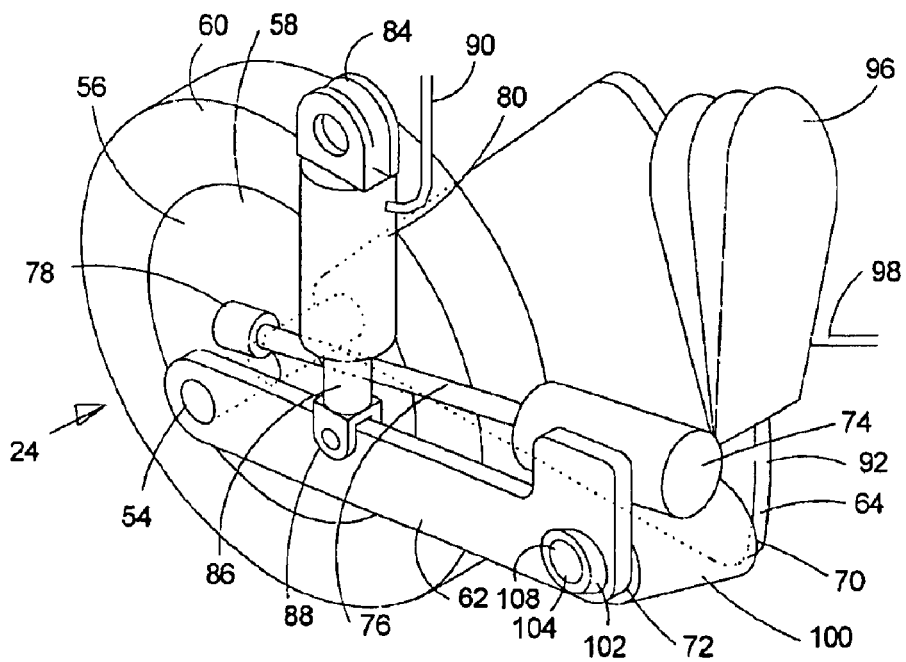
FIG. 3 is a perspective view of a rear wheel assembly according to the present invention.

A right rear wheel assembly 24 according to my invention is shown in perspective view in FIG. 3. The wheel assembly 24 comprises an axle 54 supporting a wheel 56 comprising a hub 58 and a removable pneumatic tire 60. Certain conventional features such as brakes and mounting bolts are not shown. The axle is supported by an outer arm 62 and an inner arm 64. The outer arm 62 is usually adjacent an outer side 66 of a beam, away from the position of a container. The inner arm 64 is usually adjacent an inner side 68 of a beam, near the position of a container. The inner arm 64 is attached to the support frame 40 of a beam at a first pivot 70. The outer arm 62 is attached to the support frame 40 of the beam at a second pivot 72. In my preferred embodiment, an electric drive motor 74 is mounted on the outer arm 62. A drive shaft 76 couples the motor 74 to a gear 78 that turns the wheel 56. A hydraulic actuator 80 may be provided as a means for controlling the orientation and motion of the outer arm 62. The actuator 80 has cylinder 82 with a coupling 84 for connection to the beam and a piston 86 with a coupling 88 connected to the outer arm 62. A control line 90 conducts fluid to and from the cylinder 82 to control the extension of the actuator 80 in a known manner.

it will be apparent that in this configuration, the wheel 56 is removed from its axle towards the inside of the vehicle 10, as will be explained more fully below. The inner arm 64, therefore, is configured as a hinged, generally flat triangular suspension hanger 92 that can be removed to service the wheel. An air bellows 96 is attached to the suspension hanger 92. Together with the hydraulic actuator 80, the air bag controls the orientation of the wheel through the inner arm 64. An air line 98 provides air as a control fluid for expanding or contracting the bellows. Pneumatically controlled air bags are preferred because they provide a large range of expansion at relatively low cost, but other control means could also be used.

The first pivot 70 and the second pivot 72 may be connected by, for example, a sleeve 100. The arms may be rigidly connected to the sleeve 100, and the pivots may be provided by the sleeve turning around an inner cylinder 102. A lubricant or other friction-reducing means would be provided between the inner cylinder and the sleeve. A cooling duct 104 extends through the inner cylinder. Preferably each cooling duct has an inlet 106 opening through the inner wall 68 of a beam and on outlet 108 extending through the outer wall 66 of a beam. Air flows through the cooling duct 104 to cool the lubricant between the inner cylinder 102 and the sleeve 100.

Figure 4:
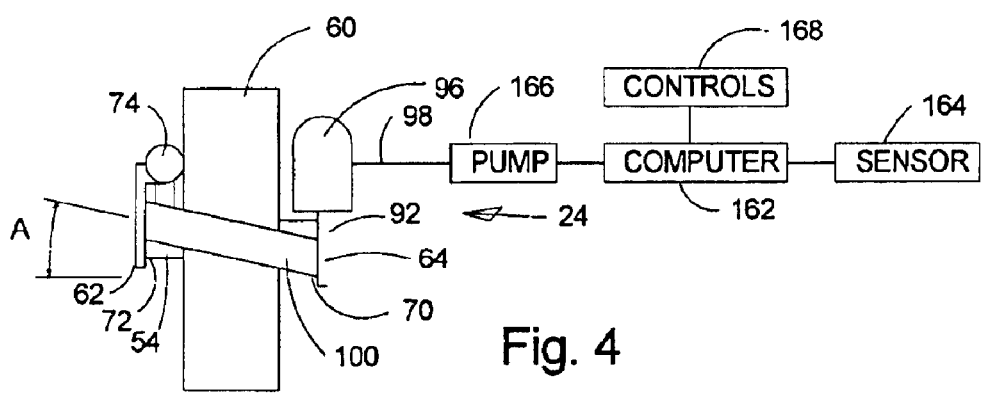
FIG. 4 is a front plan view of the wheel assembly of FIG. 3.

An important feature of the wheel assembly 24 can be seen in FIG. 4, a plan view of the right rear wheel assembly. The axle 54 is horizontal, while the sleeve 100 rises from the first pivot 70 to the second pivot 72. The second pivot is higher than the first pivot. Thus the axle and the two pivots (or the axle and the sleeve or inner cylinder) are non-coplanar, that is, if these elements were represented by a line and two points (or by two lines), they would not be contained in a single plane. A line between the first and second pivots is raised from the horizontal by an angle A. The angle A is preferably between 0.5 and 10 degrees, more preferably between 1 and 6 degrees and most preferably between 2 and 3 degrees. In particular, the angle A is preferably between 0.5 and 10 degrees for tri or quad-axle suspensions wherein the angle A may be greater on pivots located close to the rear of the vehicle and less on pivots located further away from the rear of the vehicle. As will be explained below, some of the wheel assemblies may have planar axles and pivot points. The angle A is preferably between 1 and 6 degrees particularly for tandem axle suspensions, with the angle A being greater on the pivots located close to the rear of the vehicle, and less on the pivots located farther from the rear of the vehicle. Some of the more forward wheel assemblies 28, 34 or 116 may have planar axles and pivot points. For single axle suspensions, that is, one rear wheel assembly on each beam, the angle A is most preferably between 2 and 3 degrees. The effect of the non-planar axle and pivot points is represented in FIGS. 5 through 10. In these figures a left rear wheel assembly, a mirror image of the right rear wheel assembly, is represented in a simplified fashion for clarity. The inner arm 64 is represented as a linear element, as is the outer arm 62 only the inner cylinder 102 is shown, and elements such as the sleeve, motor and bellows are omitted. It will be understood, however, that such elements may be used as described above. The inner cylinder 102 is considered to be towards the front of the vehicle 10 where the cab is located.

FIG. 5 represents the wheel assembly 24 in a neutral position. The inner arm 64 slants upwardly from the first pivot 70 to the axle 54, while the outer arm 62 slants downwardly from the second pivot 72 to the axle. The vehicle 10 is at a drive height, as represented by a lower edge 110 of the beam. As shown in the top view of FIG. 6, this orients the axle parallel to the inner cylinder 102 and the wheel 56 is co-linear with the beam. When the arms 62, 64 are forced down by the action of the actuator 80 and the air bellows 96 (not shown in these views), the vehicle 10 is elevated, as shown by the position of the lower edge 110 in FIG. 7. At the same time, the axle 54 is no longer perpendicular to the long axis of the beam, and the wheel 56 toes in toward the front of the vehicle, as shown in FIG. 8. If the vehicle 10 backs up with wheels in this orientation, the flexible beams 14, 16 will be forced apart, providing clearance so that the vehicle can be backed up around the container 12. When the vehicle has backed up a sufficient distance and the container is substantially within the beams, the arms 62, 64 are forced up, as shown In FIG. 9. The bottom edge 110 of the beam lowers to near or at the road surface, as shown in FIG. 9. The axle 54 pivots and the wheel 56 toes out with respect to the front of the vehicle 10, as shown in FIG. 10. As the vehicle is still moving backwards, the flexible beams 62, 64 will be forced together, moving the beams into contact with the container 12. The container 12 can then be secured to the vehicle.

It will be understood that the vehicle 10 as described herein is intended primarily for short haul or intra city operations, as variation in the heights of the wheels caused by driving hazards and road conditions will cause the wheels to toe in and out during driving. This has a beneficial effect of compensating for sway, a problem in high profile vehicles, at the expense of increased tire wear. The beams 14, 16 are held parallel, however, by being secured to the container 12, which becomes a part of the structure of the vehicle. If the vehicle 10 is to be moved without a container, one or more temporary spacer bars 111 should be connected between the two beams 14, 16. The temporary spacer bars may be stowed on top of the fender or beams 14, 16 when not in use.

It is preferred to mount the wheels 56 as close as possible to the sides of the container thereby minimizing the bending torque on the wheels and axles caused the container and its load not being directly over the wheels. For this reason, the electric motors are placed on the outside of the wheels and the wheels are adapted to be changed from the inside of the beams, when the container has been removed. This procedure can be made somewhat easier if the vehicle can be raised to a height sufficient to access retaining bolts below the lifting ledge 42. This condition is illustrated in FIG. 11. The bellows 96 can be provided with sufficient expansion to extend the wheel to the desired height. A hydraulic actuator 80 of sufficient length would be very expensive. In addition to the active cylinder 82, and the piston 86, the actuator 80 also has a passive cylinder 112, in which the active cylinder slides. As the wheel is lowered (and the vehicle raised), the actuator 80 essentially disengages, and all of the weight of the vehicle beams is borne by the air bellows 96.

Figure 12:
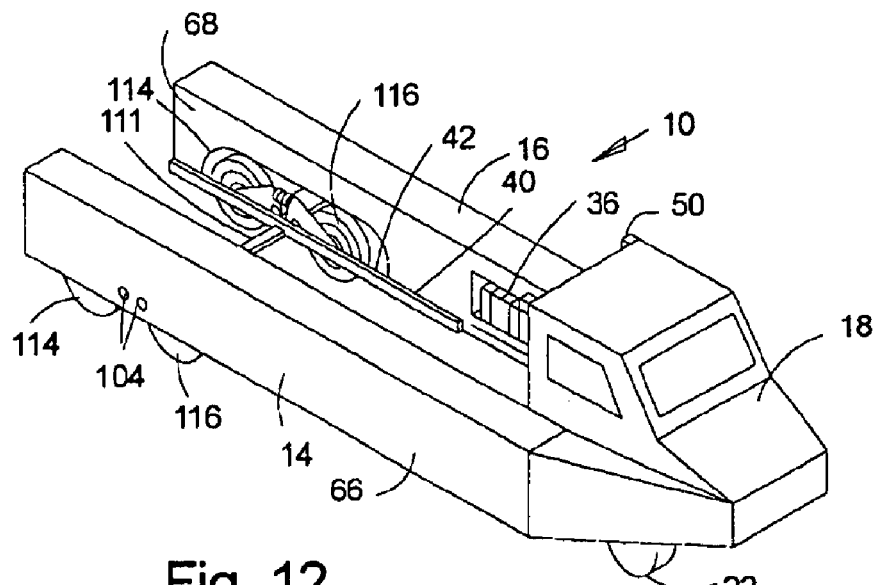
FIG. 12 is a perspective view of a vehicle according to the present invention with opposed rear wheels.
Figure 13:
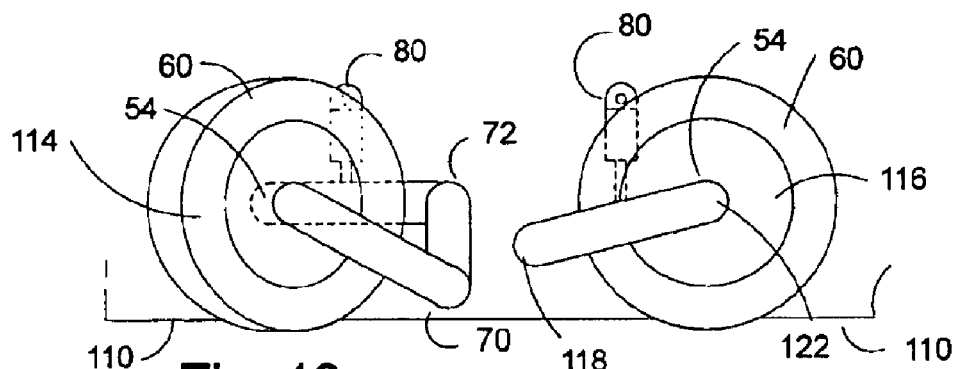
FIG. 13 is a side plan view of the opposed left rear wheels of FIG. 12 supporting a vehicle at a reduced height.
Figure 14:
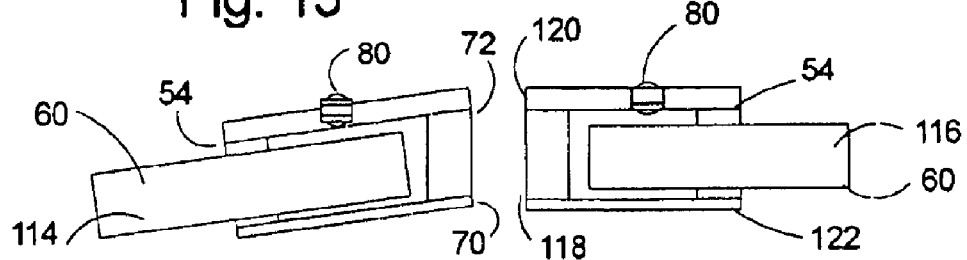
FIG. 14 is a top plan view of the opposed rear wheels of FIG. 13.

Another embodiment of the vehicle 10 is shown in FIG. 12. Vehicles with only two rear axles per beam can have an opposed or "walking" beam or axle suspension (FIG. 12). This variation consists of a "leading beam" or axle turned around backwards so that the support axle points forward instead of to the rear. With a first set of pivot points in the rear of a "leading beam" wheel assembly and with another set of pivot points for a variable toe-in "trailing beam" wheel assembly immediately behind them, suspension actuators such as air bellows can then be horizontally mounted between right angle suspension hangers attached to the axles (as in a mountain bike suspension) to offer some structural advantages such as neutralizing the forces of the tandem rear axle to lighten the structure. However, this type of suspension fails to compensate for the problem of off-tracking due to lateral forces bending the leading beams during high speed turns. This off-tracking could become so severe in a light weight, flexible suspension that a tire might rub against a fender. A vehicle with only trailing beam suspension for rear wheel assemblies can compensate for the bending of the trailing beams by leaning the vehicle into the turn by having a computer 162 coupled to an accelerometer or other suitable sensor 164 controlling the suspension height. The computer 162 controls apparatus such as a pump 168 connected through the air line 98 to the bellows or a fluid pump coupled to the hydraulic actuator 80. Manual controls 168 in the cab could also be connected to the computer 162 to control the height of the wheel assemblies. If a vehicle had a leading beam suspension with a variable toe-in feature, leaning the vehicle into the turn would increase off-tracking. Leaning a vehicle to the outside of a turn could cause cargo in the container to fall over, so the variable toe in feature is not recommended for "leading beam" wheel assemblies. Preferably, therefore, two rear wheel assemblies are provided on each of the vehicle's main structural beams 14, 16. The wheel assemblies are in walking beam configuration with their pivots adjacent each other. The back or trailing beam wheel assembly 114 has an axle 54 and pivot points 70, 72 that are non-coplanar, as described above in connection with the wheel assembly 24 and 30. The front or leading beam wheel assembly 116, in contrast, has co-planar pivot points 118, 120 and axle 122. Only the wheel 56 of the trailing beam wheel assembly 114 toes in or out as the vehicle is raised or lowered, as shown in FIGS. 13 and 14. This combination has the advantage of eliminating the tire scrub common to most tandem axle vehicles during sharp low speed turns by leaning the vehicle to the outside of the turn by means of a computer controlling the suspension height to steer the rear axle. An all trailing beam configuration is preferred for primarily high speed operation; and a walking beam configuration is preferred for primarily low speed operation. A tri-axle vehicle (three rear wheel assemblies on a single beam 14, 16) might have a combination of a pair of wheel assemblies in walking-beam configuration combined with an additional trailing beam wheel assembly. A quad-axle vehicle (four rear wheel assemblies on a single beam 14, 16) might be equipped with an ordinary trailing beam (as well known in the industry) without the variable toe in feature, in addition to variable toe-in wheel assemblies as described herein.

Figure 15:
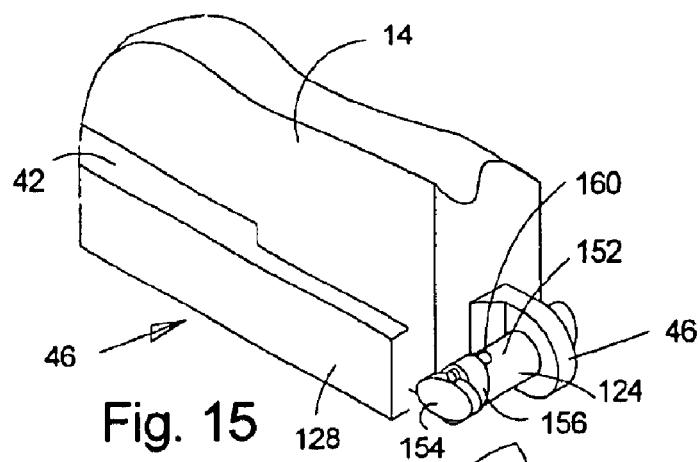
FIG. 15 is a perspective view of a spade, rail and latch for securing a cargo container in said vehicle.
Figure 16:
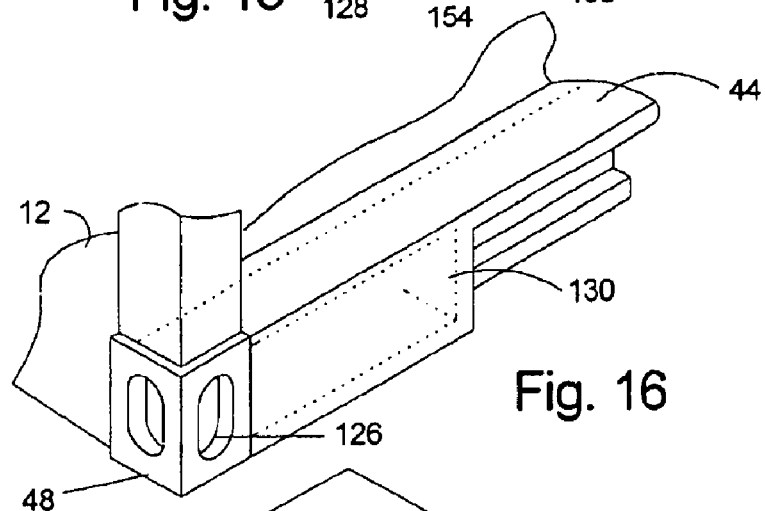
FIG. 16 is a perspective view of a corner portion of a cargo container, adapted to engage with the spade, rail and latch of FIG. 15.

When the vehicle 10 lifts the container 12, the weight of the container is primarily supported by the lip 44 on the container carried on the lifting ledge 42 on the beams 14, 16. To prevent the beams from flexing away from the container, shackles 46 on the beams are coupled into attachment sites 48 on the corners or along the bottom edges of the containers. If sufficient shackles or attachment sites are not available, temporary spacer bars may be passed under the container and secured to each beam. The temporary spacer bar 111 secures the beams against the sides of the container. More preferably, the shackles 46 comprise "T" shaped shackles 154 be inserted into holes 126 in the sides of the attachment sites 48 at, for example, the bottom rear corners of the container, as shown in FIGS. 15 and 16. The shackles 154 are turned to lock the container to the vehicle. Sleeves 156 with pop pins 160 prevent the shackles from rotating out of the holes. More preferably, a spade 128 may be provided along the lifting ledge 42. The spade 128 fits into a sleeve 130 under the lip 44 on the container 12.

Figure 17:
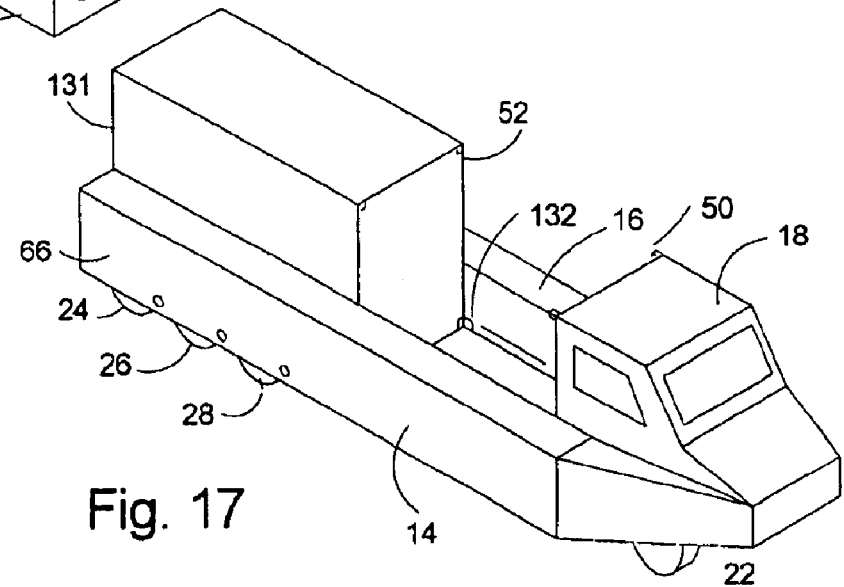
FIG. 17 is a perspective view of a vehicle according to the present invention, with a small cargo container.
Figure 22:
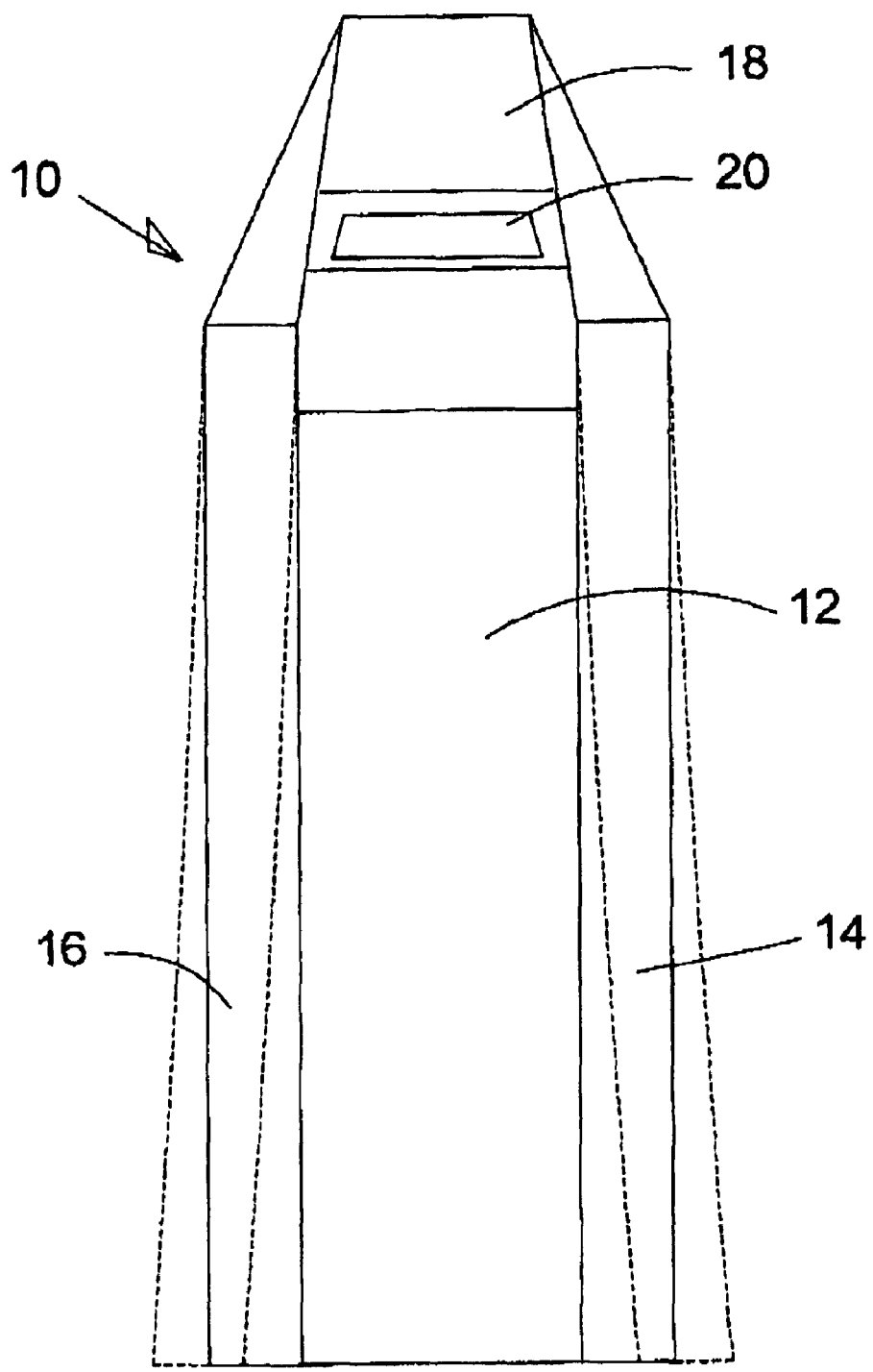
FIG. 22 is a top plan view of the vehicle and cargo container of FIG. 1, showing, in dotted lines, flexible beams bent outwardly.

The front of the container 12 is usually coupled to the vehicle at lifting pins (see FIG. 2). However, small containers 131 may also be carried in the vehicle. For example, two containers may be carried one behind the other. If a single small container 131 is carried, it should be secured at the rear of the vehicle 10, as shown in FIG. 17. This places weight over the rear driving wheels and prevents the flexible beams 14, 16 from splaying outwardly.

If one or more small containers 131 are to be carried, additional intermediate shackles 132 should be provided along the beams. As shown in FIG. 18, the intermediate shackles 132 comprise a spade 134 for engaging a sleeve on the rear corner of a small container placed adjacent the cab 18. A "T" shaped shackle 136 engages the corners of a container as described above. The middle spade 134 fits into a slot 138 in a cast steel pin block 140 (FIG. 20). The "T" shaped shackle 136 may also secure the pin block 140 through a hole 142. The pin block 140 is equipped with a lifting pin 144 similar to those extending from the back of the cab to engage front holes in the bottom front corners of the small container 131 when the small container 131 is carried by itself in the rear of the vehicle. The overall flexibility of the rear structure of the vehicle prohibits the loading of a single small container in the front of the vehicle because the strength of a container is needed for stiffness. A nylon wedge 146 may be slid behind the middle spade 134 and secured with the "T" shaped shackle 136 through a hole 148 to ease the loading of a single long container 12. A pin 148 on the beam may engage a recess 150 (shown in FIG. 19 in dotted lines) in the wedge 146 to prevent the wedge from turning. The pins 148 may be spring loaded to engage holes in the sides of the bottom front corners of containers. The end 158 may be beveled at an angle so that it will automatically retract when struck by a container and snap into place when the front of the container is firmly secured against the pin block 140. As shown in FIG. 21, similar pins 148 should be located on the inner wall 68 of the beam 16, near the pin 50 on the cab of the vehicle. The retracting mechanism can be an electrical solenoid, electrical over hydraulic, electrical over air pressure, or vacuum assist. The pins 148 may be retracted by a control in the cab and a warning may be given whenever the pins are retracted or fail to properly engage the holes.

The rotating "T" shaped shackles should be forged with a "T" shaped end sized to fit in holes in the corners of the containers. The other end of the shackle may be a mushroom shape or may be secured with nuts through a corner molding or casting which is securely bolted to the vehicle. A shaft 152 of the "T" shaped shackles 124, 136 should be forged with a necked down groove 154 designed to fail before the corner of the container does. The tensile strength of the shaft should be carefully calibrated to be less than the strength of the corners of the containers intended to be carried. Because the container is carried very near to the ground, failure of a safety shackle is preferred to failure of the container's corner casting.

A rotating sleeve 156 may be bolted behind the "T" shaped end of the shackle so that part of the sleeve will fit into the shaft's necked down groove to prevent the sleeve from sliding up and down the shaft away from the "T" shaped end. The cross section of the sleeve must be shaped to fit into the holes in the corners of containers. A spring loaded retractable "pop" type pin 160 may project through the sleeve and beside the "T" shaped end or into a pit or groove in the shackle itself in such a way as to prevent the shackle from rotating when the sleeve is inserted into an oval hole in the corner of a container. The sleeve should fall out easily from the container's hole in the event of a broken shackle to speed repairs. The safety shackles may be attached by sliding the mushroom shaped or bolted end of the shaft back through the vehicle's corner forging to retract the "T" shaped end away from the container. A spring (not shown) may be installed on the outer end of the shaft to keep the shackle retracted when not in use. After the vehicle surrounds the container, the pin in the sleeve will be pulled back and the sleeve will be rotated so that its cross section lines up with the cross section of the "T" shaped end. Both the "T" shaped end and the sleeve will be inserted into the hole in the corner of the container. With the sleeve prevented from rotating by the oval hole of the container, the "T" shaped shackle will be rotated by grasping the mushroom shaped end (or nuts on the end) until the sleeve is no longer aligned with the "T" shaped end causing the spring loaded pin to pop, trapping the "T" shaped end of the shackle in the oval hole. The end of the shackle may be equipped with a lever for rotating the shackle. A wrench may be used if the end of the shackle is secured with nuts.

To disconnect the safety shackles, the spring loaded pin (if provided) would be withdrawn and the shaft would be rotated until the cross section of the "T" shaped end is lined up with the cross section of the sleeve. The shackle and sleeve are pulled out of the hole in the corner of the container.

The spades to secure containers (FIG. 15, FIG. 18.) should also be forged with a necked down groove on one side designed to fail before the corner of the container does. A spring loaded sealed button type electrical switch may be installed behind each spade to activate a light on the vehicle's instrument panel when the attachment site of a container is properly engaged. If all containers to be used by a vehicle are equipped with sleeves 130 to receive spades, "T" shaped shackles may be redundant and may be omitted. In that circumstance, the intermediate "T" shaped shackles 132 may be replaced by a retractable pin block 140 attached to the vehicle by a hinge on the bottom in place of the shackle 132. The retractable pin block 140 may be operated from within the cab by remote control.

In the preferred embodiment of the vehicle 10, the beams 14, 16 are crash absorbent, reinforced plastic, composite box structures with variable height, active hydraulic or air ride, and metal and rubber suspension components bolted to a steel sub-frame. To take full advantage of the maneuverability and collision avoidance ability a low profile vehicle allows, the variable height front wheel assembly 22 may have a fully independent, MacPherson strut design with sway bars similar to automobiles and large vented disc brakes. A computer may be programmed to lean the vehicle when the steering wheel is turned all the way to the lock because leaning the vehicle has an effect of steering with the rear axles to improve turning radius. Buttons should also be provided on the steering wheel for this purpose, since steering with the rear wheels allows the vehicle to crab sideways when driven in confined spaces. A computer may be fitted with an accelerometer to detect high speed turns and lean the vehicle into the turns as this will counteract the natural flexibility of trailing beam suspensions and prevent off-tracking. To ease the task keeping with such an overwide vehicle in its lane, the driving position should be centrally located and the windshield etched with geometric lines to indicate when the vehicle is lined up with the road. Rear view video cameras should be installed instead of mirrors to reduce the need for the driver to turn his head to see what is behind the vehicle. A head up display should be reflected off of the windshield to inform the driver of vital functions and illuminate the windshield's geometric lines at night. High tensile, light weight steel forging may be used for the shackles and the lifting ledges and spades. Steel skid plates may be installed on the bottom of the vehicle near the shipping container. The front bumper and sides of the vehicle should be two inches higher off the ground than the skid plates and the same height as car bumpers when at normal ride height. Additional skid plates should be installed in the back of the cab where the cab slides on railroad tracks two inches above the other skid plates for sliding along rails when lifting portable railcars or locomotives.

The vehicle may be provided with a computer or other suitable controls for controlling the height of the vehicle. The computer may be programmed so that when a button to lower the vehicle is pushed once while In normal ride height mode, the vehicle will be lowered to within one inch of the ground. When the button to lower the vehicle is pushed twice after being in normal ride height mode, the bottom of the vehicle will scrape on the ground. When the button to lower the vehicle is pressed repeatedly after being In normal ride height mode, it will cycle the vehicle between one inch of the ground and scraping on the ground. When the button to raise the vehicle is pushed once while in normal ride height mode, the vehicle will raise to a higher than normal ride height, but the suspension will function normally except for developing toe-in. When the button to raise the vehicle is pushed twice after being in normal ride height mode, the vehicle will lift to the limit of its upward suspension travel and the suspension will not function normally (the hydraulic lift cylinders will disengage). When the button to raise the vehicle is pressed repeatedly after being in normal ride height mode the vehicle will cycle between higher than normal ride height and the limit of its suspension travel. When the button to return the vehicle to normal operation is pushed, the suspension will return to a height with neither toe-in nor toe-out. When the button to lower the vehicle is pushed immediately after pressing the button to raise the vehicle, the vehicle will lower by only a small amount. When the button to lower the vehicle is pushed repeatedly immediately after pressing the button to raise the vehicle, the vehicle will lower incrementally by small amounts until it is sitting on the ground after which time the vehicle should cycle between one inch above the ground and sitting on the ground. When the button to raise the vehicle is pushed immediately after pressing the button to lower the vehicle, the vehicle will raise by only a small amount. When the button to raise the vehicle is pushed repeatedly immediately after pressing the button to lower the vehicle, the vehicle will raise incrementally by small amounts until the vehicle reaches the limit of its suspension travel after which the vehicle should cycle between higher than normal ride height and the limit of its suspension travel.

The vehicle's computer may be programmed to display a schematic and cursor so that suspension components can be selected independently. The front suspension, the rear suspension, and each wheel should be capable of being selected independently. When a suspension component is selected, the buttons that control ride height should affect only the components selected. The computer should also be capable of locking out certain commands, such as the command to rise to above normal ride height when loading or unloading a barge or ship with limited headroom between decks.

One skilled in the art will recognize that other methods for providing controls may be selected without departing from the teachings of this invention.

Although I have now described my invention in connection with my preferred embodiment, those skilled in the art will recognize that my invention may take other forms without departing from the spirit or teachings thereof. The foregoing description is intended, therefore, to be illustrative and not restrictive, and the scope of my invention is to be defined by the following claims.

What is claimed is:

1. A vehicle for lifting and transporting a container, the vehicle comprising:
  a substantially U-shaped frame, said frame having first and second substantially parallel beams supported by wheels, said beams being spaced apart to receive a container there between, and being deflectable towards and away from each other,
  at least one wheel pivotally mounted on each of said beams, said wheels pivoting to toe in relative the front of said vehicle to deflect said beams away from each other as said vehicle is moved backwards, and said wheels pivoting to toe out relative to the front of said vehicle to deflect said beams towards each other as said vehicle is moved backwards.

2. The vehicle of claim 1 wherein said beams are flexible and bow outwardly or inwardly in response to the pivot of said wheal.

3. The vehicle of claim 1 further comprising a control unit, said control unit comprising operator controls and having steerable wheels, said beams being connected to said control unit.

4. The vehicle of claim 3 wherein said beams are flexible and bow outwardly or inwardly in response to the pivot of said wheel mounted on said beam.

5. The vehicle of claim 1 wherein said first beam further comprises an inner wall and an outer wall and said pivotally mounted wheel is mounted between said inner and outer walls on
   a wheel axel, said wheel axel being supported by an inner arm and an outer arm,
      said inner arm being connected to a first pivot, said first pivot being connected to said first beam adjacent said inner wall of said first beam,
      said outer arm being connected to a second pivot, said second pivot being connected to said first beam adjacent said outer wall of said first beam,
   said axel, said first pivot and said second pivot being non-coplanar.

6. The vehicle of claim 5 wherein said second pivot is higher than said first pivot.

7. The vehicle of claim 6 wherein a line between said first and second pivots is elevated from horizontal by an angle of between 0.5 and 10 degrees.

8. The vehicle of claim 7 wherein said angle is between 1 and 6 degrees.

9. The vehicle of claim 8 wherein said angle is between about 2 and 3 degrees.

10. The vehicle of claim 6 wherein said first and second pivots are connected by a support axel.

11. The vehicle of claim 10 wherein said first arm and said second arm are rigidly connected to said support axel and said support axel is pivotally connected to said first beam and further comprising an hydraulic cylinder coupled between at least one of said first and second arms and said beam, said hydraulic cylinder raising and lowering said beam with respect said wheel and simultaneously causing said wheel to pivot with respect to said beam.

12. The vehicle of claim 11 wherein said wheel pivots as the beam is raised above a neutral position such that the beam is forced outwardly when the vehicle is driven backward towards an open end of said U-shaped frame and wherein said wheel pivots as the beam is lowered below said neutral position such that the beam is forced inwardly when the vehicle is driven backward.

13. The vehicle of claim 11 wherein said support axel comprises
    an inner cylinder connected between said inner arid said outer walls of said beam, said cylinder having an air flow passage opening through said walls, and
    a sleeve rotatably mounted around said inner cylinder, said arms being rigidly connected to said sleeve.

14. The vehicle of claim 5 wherein said vehicle further comprises at least one electric motor coupled to said wheel axel of said at least one wheel.

15. The vehicle of claim 5 further comprising means for pivoting said wheel, control means for automatically controlling said pivoting means and a sensor coupled to said control means, said sensor producing a signal representative of motion of said vehicle, said control means responsive to said sensor.

16. The vehicle of claim 1 wherein said beams each further comprise an inner wall and an outer wall and said pivotally mounted wheels are each mounted between said inner and outer walls on a wheel axel, each of said wheel axels being supported by
    an inner arm and an outer arm,
       each of said inner arms being connected to a first pivot, said first pivot being connected to the respective beam adjacent said inner wall of said respective beam,
       each of said outer arms being connected to a second pivot, said second pivot being connected to a respective beam adjacent said outer wall of said respective beam,
    said axel, said first pivot and said second pivot being non-coplanar and said second pivots being higher than said first pivots.

17. The vehicle of claim 16 wherein said first and second pivots are connected by a support axel and said first arms and said second arms are rigidly connected to said support axel and each of said support axels is pivotally connected to a beam and further comprising an hydraulic cylinder coupled between at least one of said first and second arms and said beam, said hydraulic cylinder raising and lowering said beam with respect said wheel and simultaneously causing said wheel to pivot with respect to said beam, said wheels pivoting as the beams are raised above a neutral position such that the beams are forced outwardly when the vehicle is driven backward towards an open end of said U-shaped frame and said wheels pivoting as the beams are lowered below said neutral position such that the beams are forced inwardly when the vehicle is driven backward.

18. The vehicle of claim 17 further comprising a control unit, said control unit comprising operator controls and having steerable wheels, said beams being connected to said control unit, said beams are flexible and bow outwardly or inwardly in response lo the pivot of said wheels mounted on said beams.

19. The vehicle of claim 1 wherein each beam further comprises a ledge along said inner wall of said beam for supporting a container between said beams.

20. The vehicle of claim 19 wherein said means for preventing the beams from spreading comprise means for connecting to a container positioned between the first and second beams.

21. The vehicle of claim 20 wherein said means for connecting comprise a spade connected to said beam and adapted to be received in a sleeve on said container.

22. The vehicle of claim 21 wherein said spade is mounted near a wheel on a beam.

23. The vehicle of claim 22 wherein said beams each further comprise an inner wall and an outer wall and said pivotally mounted wheels are each mounted between said inner and outer walls on a wheel axel, each of said wheel axels being supported by
    an inner arm and an outer arm,
       each of said inner arms being connected to a first end of a support axel,
       each of said outer arms being connected to a second end of said support axel, said wheel axel, said support axel pivot being non-coplanar and said second end of said support axel being higher than said first end of said support axel and said first arms and said second arms are rigidly connected to said respective support axels and each of said support axels is pivotally connected to a beam and at least one spade is mounted on said beam near each support axel.

24. The vehicle of claim 1 further comprising means for pivoting said wheel, control means for automatically controlling said pivoting means and a sensor coupled to said control means, said sensor producing a signal representative of motion of said vehicle, said control means responsive to said sensor.

* * * * *